United States Patent Office 3,133,123
Patented May 12, 1964

3,133,123
VAPOR PHASE NITRATION OF CYCLOHEXANE
John H. Bonfield, Hamburg, N.Y., assignor to Allied Chemical Corporation, New York, N.Y., a corporation of New York
No Drawing. Filed Feb. 16, 1961, Ser. No. 89,613
9 Claims. (Cl. 260—644)

This invention relates to the production of mononitrated cyclohexane, and more particularly to a continuous vapor phase method for producing mononitrated cyclohexane, an important intermediate in the production of ε-caprolactam used to produce polycaproamide synthetic fibers and molding resins.

Vapor phase nitrations of aliphatic and cyclo-aliphatic hydrocarbons as heretofore practiced, are characterized by low rates of conversion. Temperatures of at least 400° C. have been proposed to cause the nitration to proceed at a fairly rapid rate. At this relatively high temperature, side reactions, of which oxidation is perhaps the most important, take place and may become predominant, at the expense of the desired nitration reaction. In order to control such undesired side reactions, it has been suggested to limit the reaction contact time to the order of one or two seconds or less and employ large molar ratios of alkane to nitrating agent. The short contact times and the excess amounts of alkane employed in such procedures, while reducing the danger of explosions, have necessitated uneconomical procedures for separating and recycling the relatively large proportions of unreacted alkane.

Furthermore, because of the highly exothermic reactions involved, many of the nitration procedures heretofore suggested present an ever present danger of explosions taking place.

It is an object of the present invention to provide a safe and efficient process for the mononitration of cyclohexane.

A further object of the invention is to provide such process involving high rates of conversion and high yields of the mononitrated cyclohexane.

Other objects and advantages of the process of the invention will be apparent from the following detailed description thereof.

According to the present invention, cyclohexane vapors and a nitrating agent comprising nitric acid or nitrogen dioxide ($NO_2$ or $N_2O_4$ or a mixture of both) also in the vapor phase are mixed at a temperature below that at which substantial nitration occurs, i.e., below 250° C., in the molar ratio of from 4 up to 10 mols, preferably from 4 to 5 mols, of cyclohexane per mol of nitric acid (as 100% $HNO_3$) or from 1 up to 5 mols, preferably from 1 to 1.5 mols of cyclohexane per mol of nitrogen dioxide (calculated as $NO_2$), and this gaseous mixture is passed through a reaction zone maintained at a temperature between about 250° C. and 375° C. for a residence time of at least 10 seconds, preferably from 20 seconds to 150 seconds.

Preferably, the temperature and residence times within their specified ranges bear an inverse relation to each other, i.e., when the temperature is in the upper portion of the range 250° to 375° C. shorter residence times are used within the range of from 20 to 150 seconds and when the temperature is in the lower portion of the 250° to 375° C. range longer residence times within the range of from 20 to 150 seconds are employed. The optimum residence time and temperature, within the aforesaid ranges, depend on the reactor in which the nitration is carried out; the nitrating agent used, whether nitric acid or nitrogen dioxide; and the particular molar proportions of the reactants employed within the ranges hereinabove disclosed. Preferably, the reaction is carried out under substantially atmospheric pressure conditions for the residence time and at the temperature specified. The reaction mixture is removed from the reaction zone and the mononitrated cyclohexane separated therefrom. The unreacted cyclohexane is recovered from the reaction gases and can be recycled to the nitration reaction zone and eventually substantially entirely converted to mononitrocyclohexane.

High conversion rates of the cyclohexane to mononitrocyclohexane take place per pass through the reaction zone and high yields of mononitrocyclohexane are produced at the relatively low reaction temperatures and high residence times employed. Moreover, the reaction proceeds smoothly and safely. Under these conditions of temperature, residence time and reactant proportions (the combination of all three is important), no danger of explosion arises.

According to a further feature of the present invention, at least 0.5 mol of nitric oxide (NO) per mol of nitrating agent is incorporated in the gaseous reaction mixture prior to the nitration reaction. Such addition of nitric oxide unexpectedly increases the yield of nitrated cyclohexane.

The cyclohexane in the vapor phase is admixed with the nitrating agent comprising nitric acid or nitrogen dioxide, also in the vapor phase, at a temperature below that at which substantial nitration of the hydrocarbon occurs, i.e., below about 250° C., and preferably between about 120° C. and 180° C. This pre-mixing step avoids the production of localized explosive mixture of cyclohexane and nitrating agent. It is important to mix the cyclohexane vapors with vapors of the nitrating agent because liquid solutions of the cyclohexane in the nitrating agent, particularly nitrogen dioxide (in the form of nitrogen tetroxide), are known to be unpredictably explosive.

When nitric acid is employed as the nitrating agent, at least 4 mols and preferably 5 mols, but less than 10 mols, of the cyclohexane are mixed with each mol of nitric acid. Nitric acid of commerce may be used (concentration about 68%) or nitric acid of any available concentration, the more concentrated the better. When nitrogen dioxide is employed, at least an equimolar ratio of reactants should be used, and it is desirable to utilize a ratio of about 1.5 mols of the cyclohexane per mol of nitrogen dioxide, preferably about 1.4 mols, but less than 5 mols of cyclohexane per mol of nitrogen dioxide.

It is preferred to employ nitrogen dioxide rather than nitric acid as the nitrating agent because the former material can be utilized with lesser molar excesses of the cyclohexane, thereby reducing the proportion of unreacted cyclohexane recycled to the reaction zone. Whether nitric acid or nitrogen dioxide is used as the nitrating agent, utilization of the above specified molar ratios of cyclohexane to nitrating agent, the temperature conditions and residence times above disclosed insure safety from explosion hazards.

The mixture of cyclohexane vapors and gaseous nitrating agent is passed through a reaction zone maintained at a temperature between 250° C. and 375° C. for a residence time of at least 20 seconds. Since reactor dimensions must be increased with increasing residence time, and since the quality of the nitrated product decreases as residence times are increased above 70 seconds, it is preferred to employ residence times of from 20 to 70 seconds; residence times of from 40 to 50 seconds are especially preferred, among other reasons, because the yield of mononitrated cyclohexane formed in the reaction zone reaches optimum values at residence times within this range. Using nitric acid as the nitrating agent, the preferred reaction temperature is between 290° and 310° C. Employing nitrogen dioxide, the preferred temperature of operation is between 265° and 285° C.

As noted, nitric oxide may be admixed with the reaction mixture either by addition to the nitrating agent or to the mixture of reactants. The addition of nitric oxide increases the yield of the mononitrated cyclohexane. While the explanation for this phenomenon is not fully understood, it is believed that the nitric oxide serves to minimize the concentration of oxygen in the reaction mixture. It is known that nitric acid dissociates completely at temperatures above about 250° C. according to the reaction:

(I) $\quad 4HNO_3 \rightleftharpoons 2H_2O + 4NO_2 + O_2$

Additionally, nitrogen dioxide dissociates above about 150° C. with increasing temperature to produce nitric oxide and oxygen by the reaction:

(II) $\quad 2NO_2 \rightleftharpoons 2NO + O_2$

It is believed that the introduction of nitric oxide into the reaction mixture, especially when added prior to exposure to reaction temperatures, i.e., prior to raising the temperature of the reaction mixture to between about 250° C. and 375° C., serves to suppress the dissociation Reaction II and thus to minimize the concentration of oxygen in the reaction mixture.

The nitric oxide is preferably added to the reaction mixture during the pre-mixing step; alternatively, the nitric oxide may be added at any time prior to that at which the nitrogen dioxide undergoes any appreciable dissociation. The amount of nitric oxide admixed with the reactants is preferably from 0.5 to 1 mol of nitric oxide per mol of nitrating agent. Greater proportions of nitric oxide than 1 mol per mol of nitrating agent can be used though such additional amounts are not significantly more effective in suppressing the dissociation. Further, the nitric oxide acts as an inert diluent and thus shortens the effective contact time between the reactants and tends to reduce the yield. Accordingly, excesses of nitric oxide above 1 mol per mol of nitrating agent should be avoided.

While the admixture of nitric oxide with the reactants is preferred, this invention is not limited to such procedures but includes nitrations of cyclohexane under the specified conditions without the addition of nitric oxide to the reactants.

The condensable portion of reaction mixture from the reaction zone is condensed, the unreacted cyclohexane separated, for example, by fractional distillation, from the reaction mixture and, if desired, recycled to the reaction zone. From the residue, nitrocyclohexane can be recovered in any suitable manner, as by fractional distillation, conversion to the ammonium salt, etc. The non-condensable portion, comprising oxides of nitrogen can be oxidized, e.g., with hydrogen peroxide, to form nitric acid.

The reaction is carried out by flowing separate streams of the cyclohexane vapor and the nitrating agent, also in the vapor phase, through preheaters, then mixing the preheated vapors to form a vapor mixture at a temperature below 250° C. and passing this mixture through the reaction zone maintained at the reaction temperature. Alternatively, cyclohexane vapors may be mixed with vapors of the nitrating agent, the resultant vapor mixture preheated to a temperature below the reaction temperature and the preheated mixture introduced into the reaction zone. The mixture is passed continuously through the reaction zone which is so dimensioned as to give the desired residence time.

The equipment used for the practice of the process should, of course, be resistant to corrosion by nitric acid; glass, glass-lined or acid-resistant stainless steels can be used.

The following examples in which temperatures are given in ° C., and parts and percentages are on a weight basis unless otherwise specified, illustrate preferred modes of practicing the invention. It will be understood the invention is not limited to these examples.

EXAMPLE 1

Cyclohexane and 68% nitric acid were vaporized separately and the vapors mixed at about 180° at the hourly rate of 271 parts of cyclohexane and 60 parts (40.8 parts 100% $HNO_3$) of nitric acid. The mixed vapors were then passed into a spherical glass reactor of 550 parts volume held at 350° by a molten alloy bath. The residence time of the mixed vapors within the reactor was about 35 seconds. The gases emanating from the reaction vessel were condensed and the non-condensable portion was bubbled into a solution of hydrogen peroxide.

The liquid condensed from the reaction gases was permitted to stratify into two layers, an organic layer containing unreacted cyclohexane and the nitrocyclohexane and an aqueous layer containing 7.2 parts of nitric acid. The organic layer was distilled in vacuo to separate the unreacted cyclohexane. The residue was then distilled with steam to yield a light yellow oil, which on fractional distillation yielded 11.8 parts of pure nitrocyclohexane (B.P. 76°/10 mm. Hg abs. pressure).

The uncondensed gases were passed into the hydrogen peroxide and yielded 20.65 parts of nitric acid. At the end of one hour, 0.09 mol of nitrocyclohexane was produced; the conversion was 14.1% and the yield was 43.5% based on nitric acid consumed.

EXAMPLES 2 TO 6

Examples 2 to 6, inclusive, were carried out using the same procedure as described in Example 1, except for the residence times and reaction temperatures noted in Table I below. The molar ratio of cyclohexane to nitric acid was 4 to 1. This series of examples illustrates that the residence time and reaction temperature within their respective specified ranges bear an inverse relation to each other.

*Table I*

| Example | Residence Time, Sec. | Temp. | Yield (Mol Percent) Based on Cyclohexane Consumed |
| --- | --- | --- | --- |
| 2 | 20 | 315 | 31.5 |
| 3 | 25 | 310 | 32.5 |
| 4 | 30 | 305 | 33.0 |
| 5 | 35 | 303 | 34.0 |
| 6 | 40 | 300 | 36.0 |

EXAMPLE 7

In a two-hour period, 538 parts of cyclohexane and 209.2 parts of nitrogen dioxide (from nitrogen tetroxide) were vaporized and mixed at about 140°. The mixture was heated in a spherical reactor to 275° and maintained therein for a period of 42.5 seconds. Thereafter, the reacted mixture was passed through a condenser and the condensables separated from the reaction off-gas which was essentially nitric oxide.

The condensed reaction products were permitted to stratify. The organic layer weighing 608 parts was separated from the aqueous layer, consisting of 29 parts of water formed in the reaction. The organic layer was distilled to give 418 parts of unreacted cyclohexane and 141 parts of crude nitrocyclohexane containing 114 parts of pure nitrocyclohexane. This amount of pure product represents a yield of 63% based on cyclohexane consumed, and a conversion of 22.3%.

From the off-gas an amount of nitric acid equivalent to 109 parts of nitrogen dioxide was obtained. Thus the yield with respect to nitrogen dioxide consumed was 40.6% and the conversion rate was 48.0%.

EXAMPLES 8 TO 12, INCLUSIVE

In a similar manner to that described in above Example 7, cyclohexane and nitrogen dioxide were reacted for the residence times and at the reaction temperatures indicated in connection with each of Examples 8 to 12, inclusive, in Table II below. In each instance a ratio of 1.0 mol of $NO_2$ to 1.4 mols of cyclohexane was used. The yield with respect to cyclohexane consumed and the amount of nitrocyclohexane in the product as produced in these examples are given in Table II as follows:

Table II

| Example | Residence Time, Sec. | Reaction Temp., °C. | Nitrocyclohexane in Product, percent | Yield (Mol percent) Based on Cyclohexane Consumed |
|---|---|---|---|---|
| 8 | 20 | 302 | 17.0 | 60.0 |
| 9 | 30 | 290 | 18.3 | 62.0 |
| 10 | 40 | 282 | 19.6 | 65.5 |
| 11 | 50 | 280 | 21.0 | 66.0 |
| 12 | 60 | 279 | 16.0 | 64.5 |

From this data, it can be seen that the yield and amount of nitrocyclohexane produced increases with the residence time to a maximum at about 50 seconds and then drops off. It is also evident that the use of nitrogen dioxide as the nitrating agent makes possible operation at lower molar ratios and hence more efficiently and with less recycling.

A further advantage of the present invention is that it results in an improvement in the quality of the crude mononitrocyclohexane. The quality or the purity of the crude nitrocyclohexane obtained after removal of the unreacted cyclohexane is one indication of the efficiency of the nitration. Examples 13 and 14 of this invention were carried out under the conditions of residence time and temperature indicated in Table III below. The reactant proportions in these examples were the same as in Example 7.

Table III

| Example | Residence Time, Sec. | Reaction Temp., degree | Nitrocyclohexane in Crude, percent |
|---|---|---|---|
| 13 | 35.0 | 295 | 74 |
| 14 | 42.5 | 285 | 81 |

It will be noted that Examples 13 and 14 gave a crude product containing 74% and 81%, respectively, of mononitrated cyclohexane. In the case of comparative runs with residence times of less than 10 seconds under optimum temperature conditions, the quality of the crude was markedly inferior to that obtained in the above examples and the yield was significantly lower.

EXAMPLE 15

538 parts of cyclohexane, 209.2 parts of nitrogen dioxide and 136 parts of nitric oxide were pre-mixed at a temperature of about 200° and the mixture thus formed was continuously passed through a reactor maintained at 280° at a rate such that the residence time therein was 62.5 seconds. The reaction products were passed through a condenser to remove therefrom condensables and the off-gas was vented to the atmosphere.

The condensate separated into two layers. From the upper organic layer, 425 parts of cyclohexane were recovered by distillation. The residue weighed 156.3 parts and contained 80% nitrocyclohexane. Thus, 125 parts of nitrocyclohexane were produced which represented a yield of 72% based on cyclohexane consumed.

It will be noted that the present invention provides an efficient and safe process for the vapor phase mononitration of cyclohexane. Since certain changes can be made in carrying out this process without departing from the scope of the invention, it is intended that all matter contained in the above description shall be interpreted as illustrative and not in a limiting sense. Moreover, while certain theoretical explanations have been given in the specification to facilitate a better understanding of this invention, it will be understood that this invention is not to be limited in any way by these theoretical explanations.

What is claimed is:

1. A process for mononitrating cyclohexane in the vapor phase comprising, mixing vapors of cyclohexane and vapors of a nitrating agent selected from the group consisting of nitric acid and nitrogen dioxide at a temperature below that at which substantial nitration occurs in the proportions of from 4 up to 10 mols of cyclohexane per mol of nitric acid when using nitric acid as the nitrating agent and in the proportions of from 1 up to 5 mols of cyclohexane per mol of nitrogen dioxide, calculated as $NO_2$, when using nitrogen dioxide, the said mixing being effected by mixing the vapors of cyclohexane and the vapors of the nitrating agent with both in the vapor phase and in the absence of liquid phase reactants, passing the resultant gaseous mixture through a reaction zone maintained at a temperature between 250° C. and 375° C. for a residence time of at least 20 seconds, removing the resultant reaction mixture from said reaction zone, and separating the mononitrated cyclohexane from said mixture.

2. The process as defined in claim 1, in which nitric oxide is incorporated in the reaction mixture prior to its passage through said reaction zone.

3. The process as defined in claim 1, in which the gaseous mixture is maintained in the reaction zone for a residence time of from 20 to 150 seconds and the temperature in said reaction zone and said residence time are in inverse relation to each other within their respective ranges.

4. A process for mononitrating cyclohexane in the vapor phase comprising, continuously flowing separate streams of cyclohexane vapor and nitric acid vapor, mixing these two streams to produce a mixture at a temperature between 120° and 180° C. containing from 4 to 5 mols of cyclohexane per mol of nitric acid, continuously reacting said gaseous mixture for a period of from 20 to 70 seconds in a reaction zone maintained at between 290° C. and 310° C., continuously removing said mixture from said zone and separating mononitrocyclohexane from said mixture.

5. The process as defined in claim 4, in which between 0.5 and 1.0 mol of nitric oxide per mol of nitric acid are admixed with said mixture prior to entry into said reaction zone.

6. A process for mononitrating cyclohexane in the vapor phase comprising, continuously flowing separate streams of cyclohexane vapor and nitrogen dioxide in the gaseous phase, mixing the two streams to produce a gaseous mixture at a temperature within the range of from 120° to 180° C. containing from 1 to 1.5 mols of cyclohexane per mol of nitrogen dioxide, continuously passing said gaseous mixture through a reaction zone maintained at between 250° C. and 375° C. under substantially atmospheric pressure for a residence time of from 20 to 70 seconds, continuously removing said mixture from said zone, and separating mononitrated cyclohexane from said mixture.

7. The process defined in claim 6, in which from 0.5 to 1 mol of nitric oxide per mol of nitrogen dioxide is added to said mixture prior to passage thereof through said reaction zone.

8. A process for mononitrating cyclohexane in the vapor phase comprising, continuously preheating a stream of cyclohexane vapor, separately preheating a stream of nitrogen dioxide gas, mixing the two preheated streams to produce a gaseous mixture at a temperature between 120° and 180° C. containing from 1 to 1.5 mols of cyclohexane per mol of nitrogen dioxide, continuously reacting said gaseous mixture for a period of from 40 to 50 seconds in a reaction zone maintained at between 265° C. and 285° C., continuously removing said mixture from said zone and separating mononitrocyclohexane from said mixture.

9. A process as defined in claim 8, in which between 0.5 and 1.0 mols of nitric oxide per mol of nitrogen dioxide are admixed with said mixture prior to entry into said reaction zone.

References Cited in the file of this patent

UNITED STATES PATENTS

| 1,967,667 | Hass et al. | July 24, 1934 |
| 2,071,122 | Hass et al. | Feb. 16, 1937 |
| 2,512,587 | Stengel | June 20, 1950 |
| 2,894,041 | Berg | July 7, 1959 |

UNITED STATES PATENT OFFICE

CERTIFICATE OF CORRECTION

Patent No. 3,133,123 May 12, 1964

John H. Bonfield

It is hereby certified that error appears in the above numbered patent requiring correction and that the said Letters Patent should read as corrected below.

Column 1, line 58, for "10" read -- 20 --; column 5, line 44, for "monoitrocyclohexane" read -- mononitrocyclohexane --; column 5, Table III, heading to the third column thereof, for "degre" read -- degree --.

Signed and sealed this 22nd day of September 1964.

(SEAL)
Attest:

ERNEST W. SWIDER
Attesting Officer

EDWARD J. BRENNER
Commissioner of Patents